US007921599B2

(12) United States Patent
Irwin

(10) Patent No.: US 7,921,599 B2
(45) Date of Patent: Apr. 12, 2011

(54) VEGETATION SUPPORT SYSTEM

(75) Inventor: George Irwin, Rochester, NY (US)

(73) Assignee: George A. Irwin, Irondequoit, NY (US)

( * ) Notice: Subject to any disclaimer, the term of this patent is extended or adjusted under 35 U.S.C. 154(b) by 141 days.

(21) Appl. No.: 12/246,566

(22) Filed: Oct. 7, 2008

(65) Prior Publication Data

US 2010/0083571 A1    Apr. 8, 2010

(51) Int. Cl.
A01G 9/02 (2006.01)
(52) U.S. Cl. ............................. 47/66.1; 47/66.5; 47/83
(58) Field of Classification Search ............... 47/65.9, 47/66.1, 67, 66.5, 83, 86, 85; 220/507
See application file for complete search history.

(56) References Cited

U.S. PATENT DOCUMENTS

| 2,113,523 | A | | 4/1938 | White | |
|---|---|---|---|---|---|
| 2,121,173 | A | * | 6/1938 | MacPherson | 47/33 |
| 2,279,735 | A | * | 4/1942 | Gates | 47/33 |
| 4,118,892 | A | * | 10/1978 | Nakamura et al. | 47/65.9 |
| 4,961,284 | A | | 10/1990 | Williams | |
| 5,287,650 | A | | 2/1994 | Moriguchi et al. | |
| 5,410,840 | A | | 5/1995 | Loesken | |
| 5,647,695 | A | | 7/1997 | Hilfiker et al. | |
| 6,098,337 | A | * | 8/2000 | Chen et al. | 47/62 A |
| 6,178,690 | B1 | | 1/2001 | Yoshida et al. | |
| 6,237,285 | B1 | | 5/2001 | Yoshida et al. | |
| 6,725,601 | B2 | | 4/2004 | Chick | |
| 6,862,842 | B2 | | 3/2005 | Mischo | |
| 7,536,829 | B2 | * | 5/2009 | Genma et al. | 47/67 |
| 2006/0242901 | A1 | * | 11/2006 | Casimaty et al. | 47/65.9 |
| 2007/0094927 | A1 | | 5/2007 | Perry | |
| 2007/0199241 | A1 | * | 8/2007 | Peleszezak | 47/65.9 |
| 2010/0095586 | A1 | * | 4/2010 | Sichello | 47/65.9 |

* cited by examiner

Primary Examiner — Rob Swiatek
Assistant Examiner — Kristen C Hayes
(74) Attorney, Agent, or Firm — Tracy Jong Law Firm; Tracy P. Jong; Cheng Ning Jong

(57) ABSTRACT

A panel assembly includes a plurality of open faced cells fluidly interconnected for retaining a growing medium and live vegetation in a vertical orientation of the panel assembly. The fluid interconnection of the cells provides for gravitationally induced water transfer from the growing medium of a first cell to the growing medium of a second cell, as well as root growth between the cells.

7 Claims, 8 Drawing Sheets

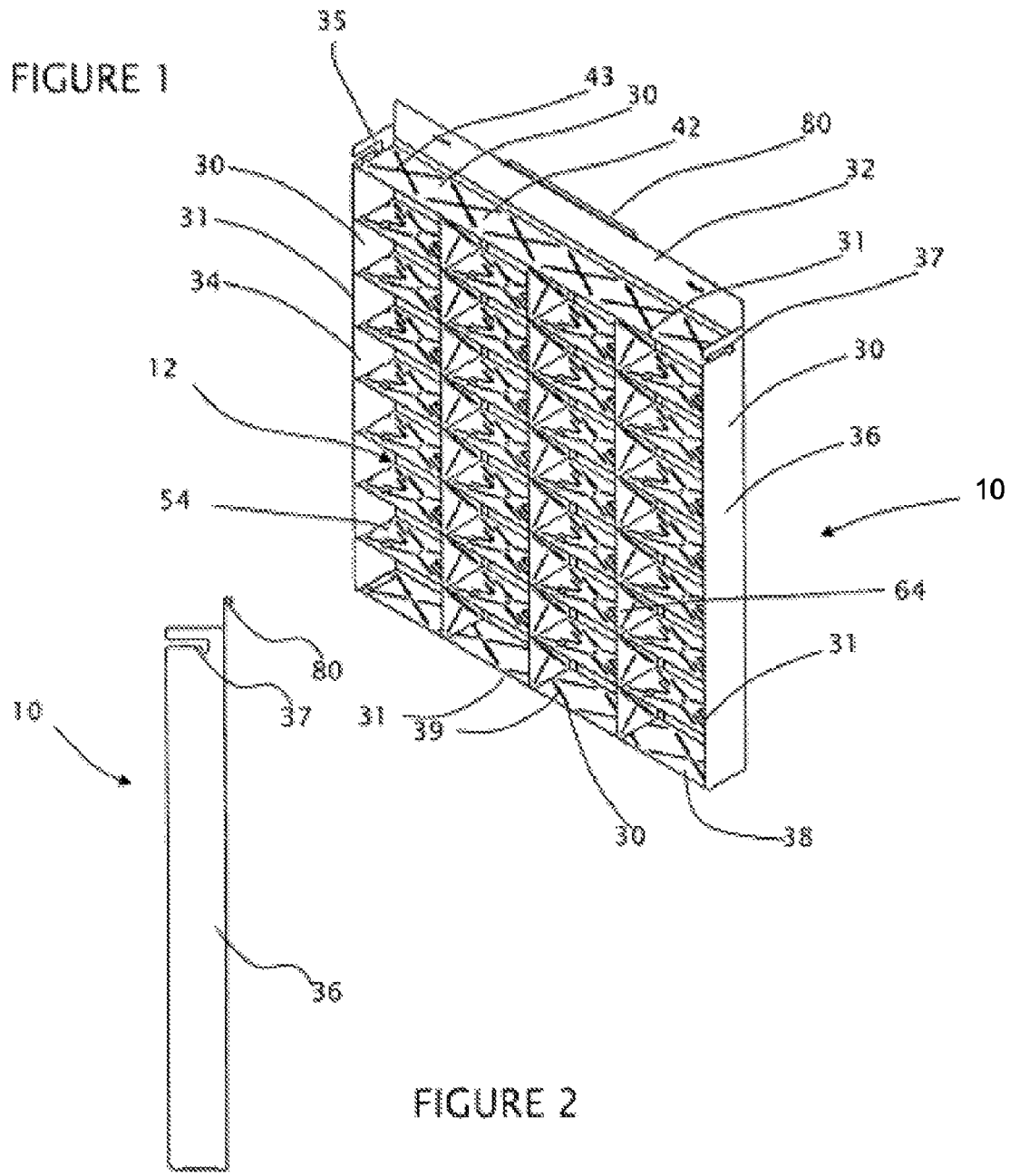

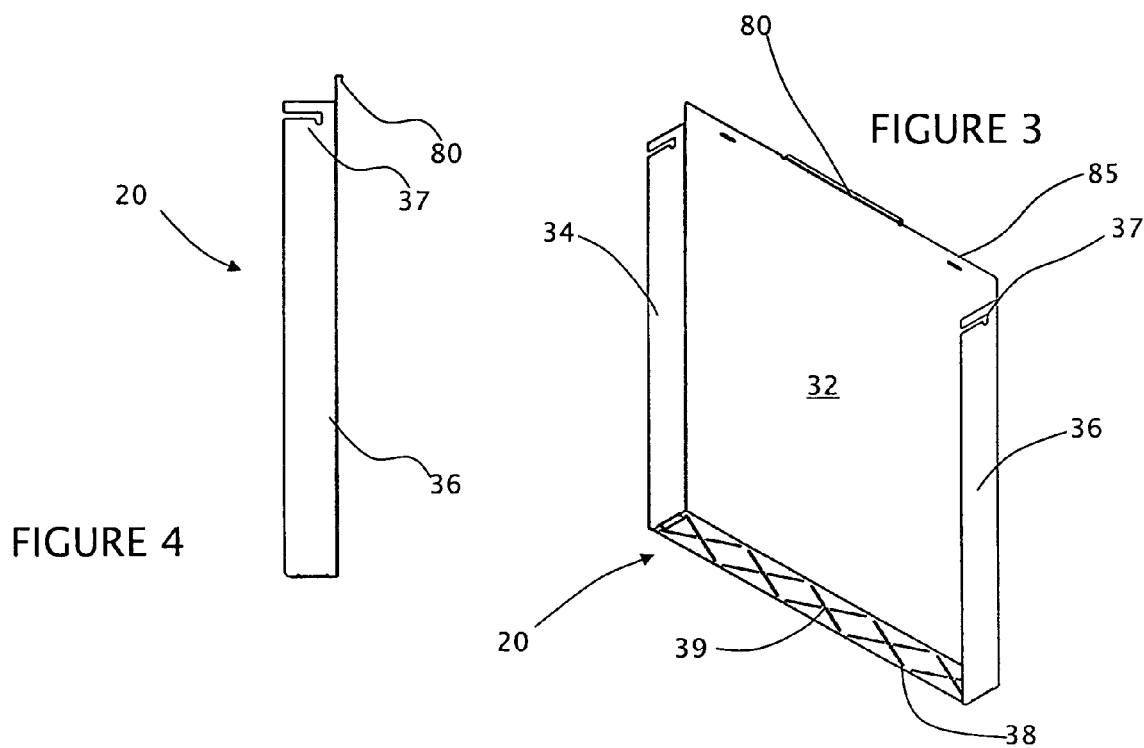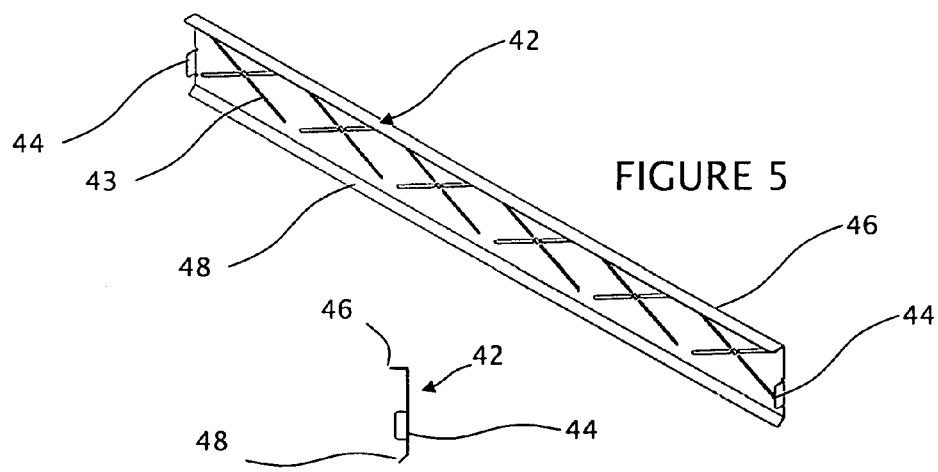

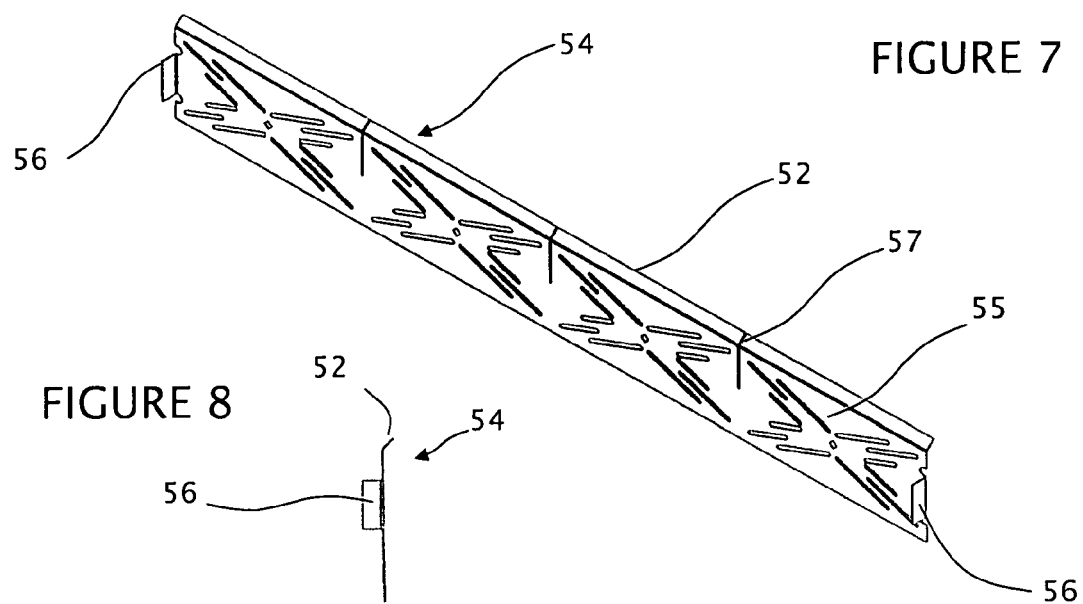
FIGURE 7
FIGURE 8
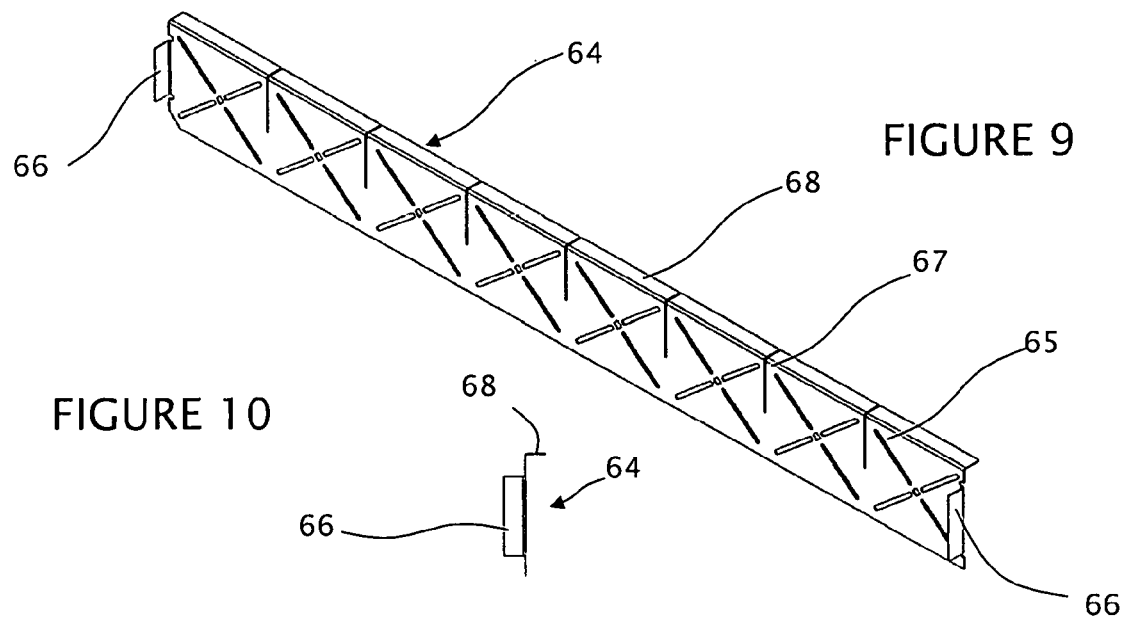
FIGURE 9
FIGURE 10

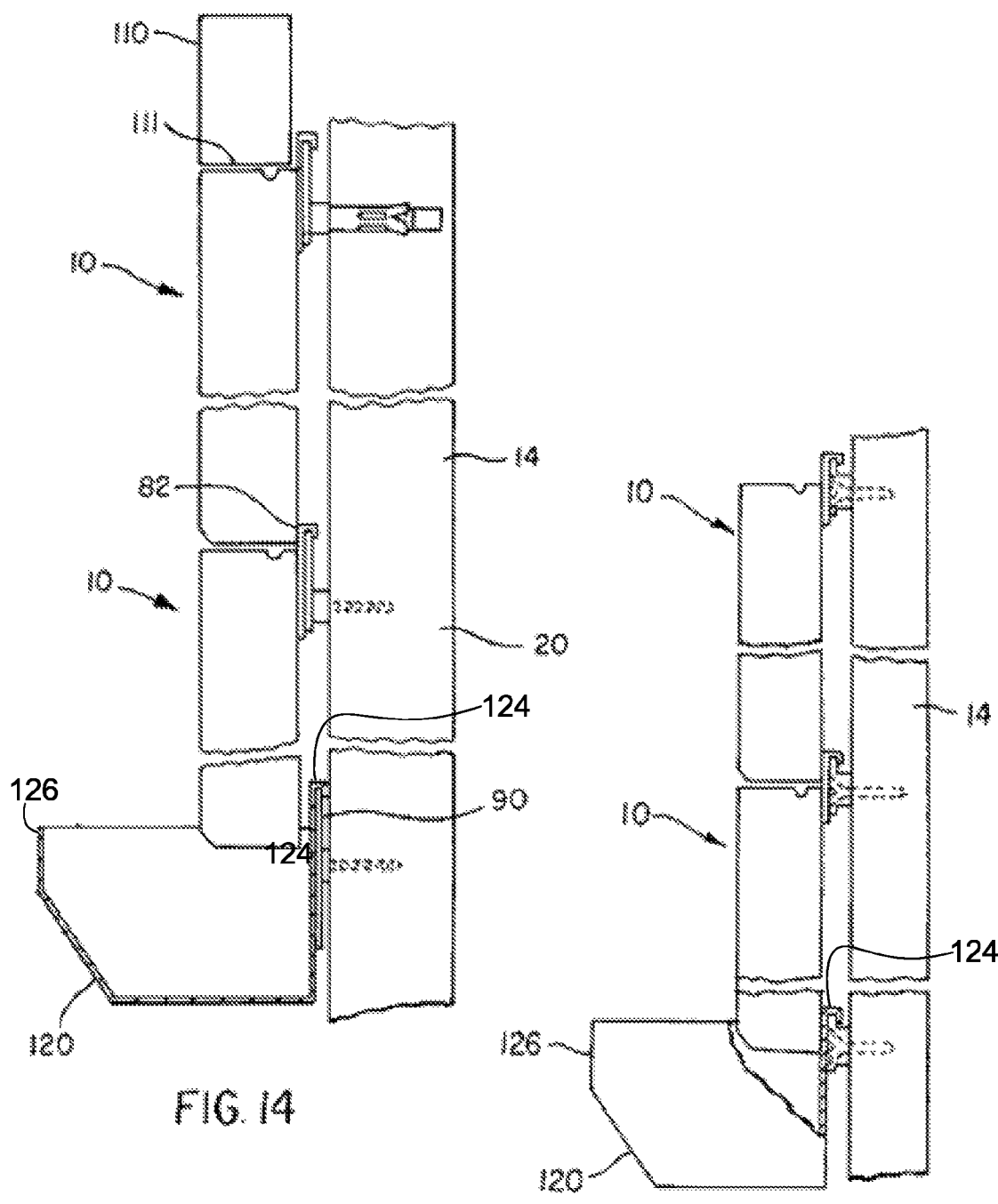

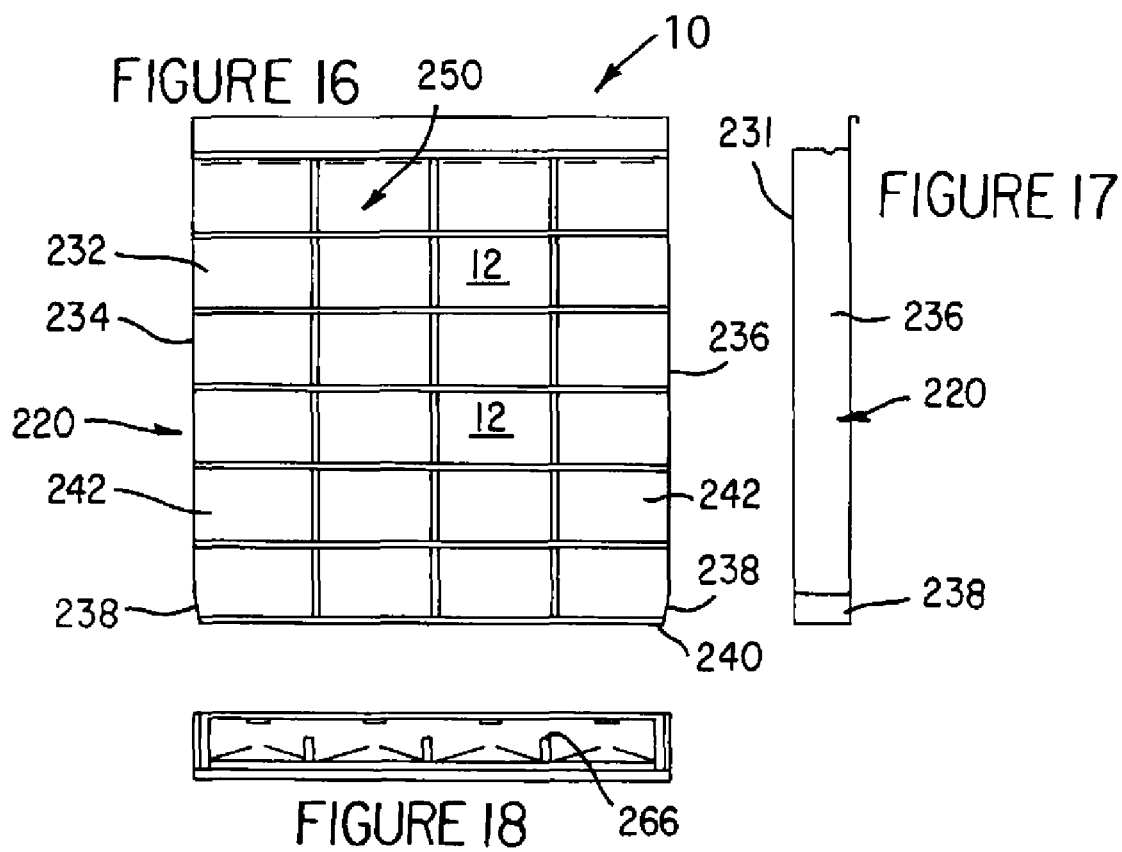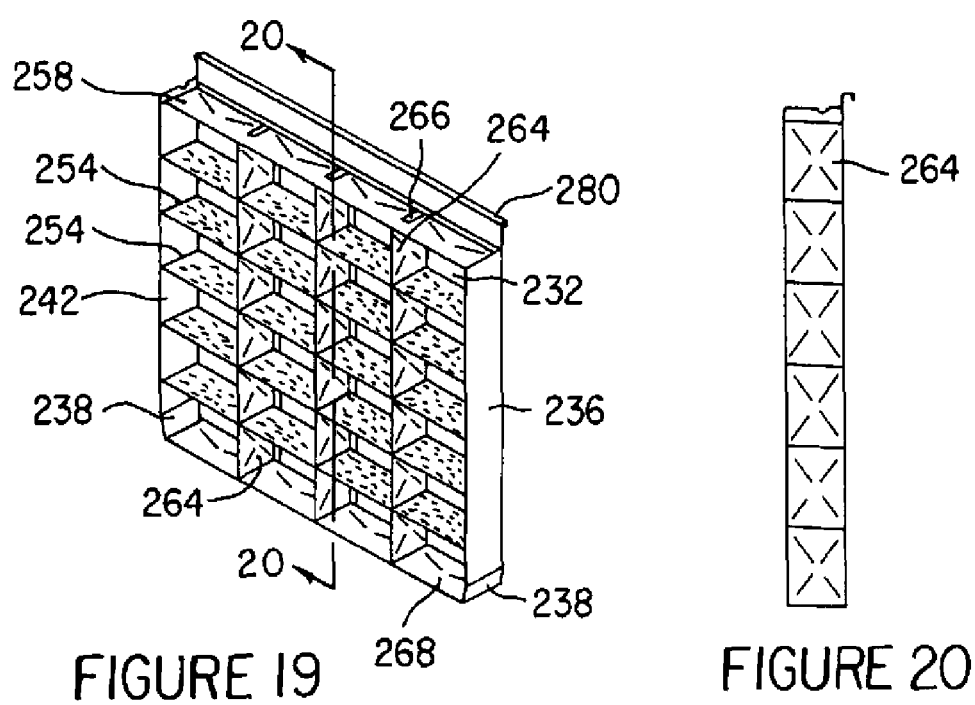

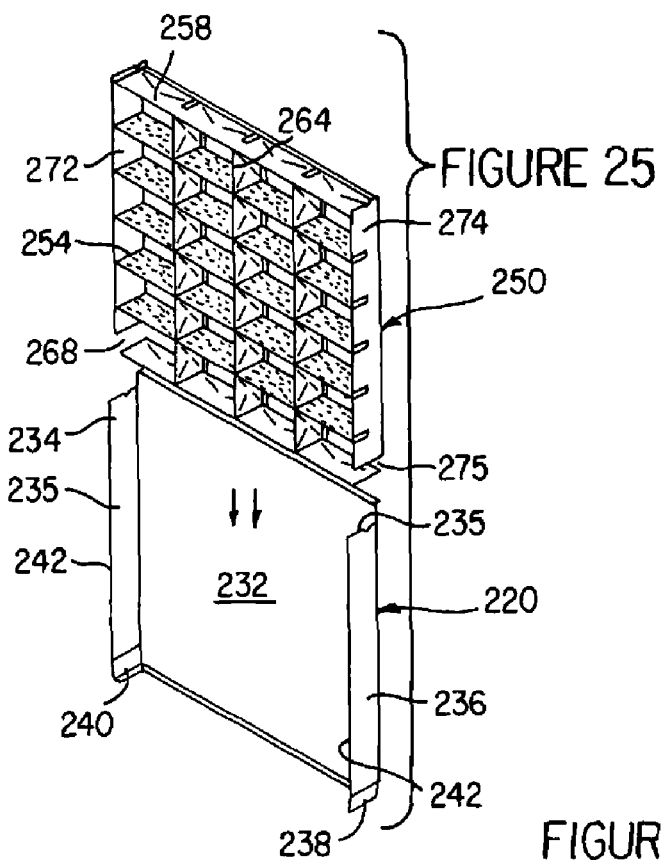
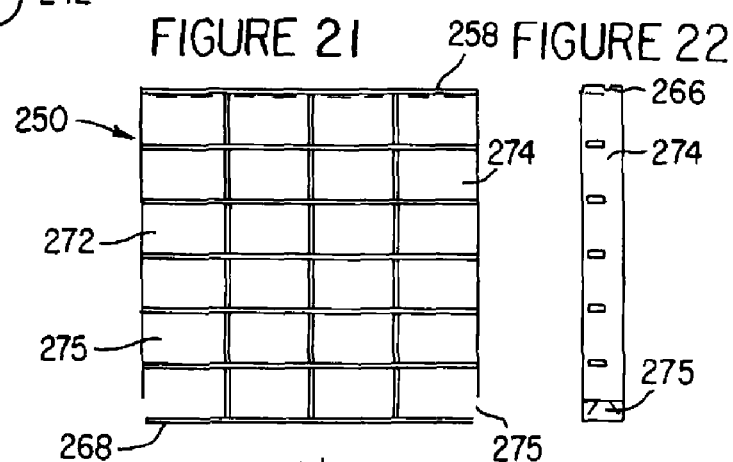
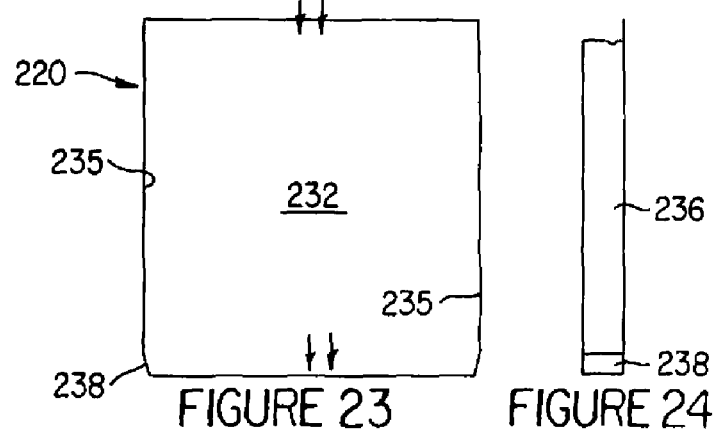
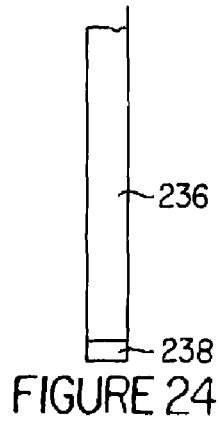

VEGETATION SUPPORT SYSTEM

BACKGROUND OF THE INVENTION

1. Field of the Invention

The present invention relates to a system for supporting live vegetation growth in an inclined or vertical orientation and more particularly to an open face, inclined or vertically oriented assembly for retaining and sustaining vegetation.

2. Description of Related Art

Increased education and sensitivity has raised the awareness of impact of environmental conditions by humans and on humans. Thus, the interplay between human controlled environmental conditions and natural conditions is more aggressively explored for enhancing available conditions for humans, while reducing negative impact on the environment. For example, a NASA study found that common house plants could improve air quality. In fact, the NASA study reported that houseplants were able to remove up to 87% of certain air toxins in 24 hours.

Portions of the medical community have stated that house plants make people feel calmer and more optimistic. Such studies have shown that hospital patients who face a window with a garden view recovered more quickly than those who had to look at a wall.

According to a Norwegian University of Agriculture study, indoor plants can reduce fatigue, coughs, sore throats and other cold-related illnesses by more than 30%, partially by increasing humidity levels and decreasing dust.

Even office and work environments are beginning to add indoor plants to improve employee health and morale. According to one study published in Rehabilitation Literature, a manufacturing company integrated plants into its office so that no employee would be more than 45 feet from greenery, consequently, company administrators reported enhanced creativity and increased productivity in employees.

While traditional pots have been used to retain indoor plants, the pots suffer from numerous disadvantages. For example, the pots occupy a comparatively large foot print relative to the amount of sustained vegetation. In addition, traditional pots often employ an excessive amount of soil than is required and thus are hydrologically inefficient, which can lead to increased maintenance costs or loss of plants.

Therefore, the need exists for a system of retaining and supporting indoor vegetation, while reducing the required footprint. The need also exists for a vegetation support system that efficiently sustains a relatively large vegetation growth, while reducing or minimizing maintenance and water requirements.

BRIEF SUMMARY OF THE INVENTION

A panel assembly for retaining and sustaining vegetation is disclosed. The panel assembly sustains vegetation growth in an inclined or vertical orientation of the assembly, thereby reducing the required footprint of the assembly, while providing enhanced vegetation.

In one configuration, the panel assembly includes a tray having an impervious back wall and a peripheral wall extending perpendicular to the back wall; and a plurality of divider walls extending perpendicular from the back wall, the divider walls defining a plurality of cells within the peripheral wall and a growing medium in the cells, wherein the cells include a first cell, an upper adjacent cell and a lower adjacent cell, the divider walls including apertures between the first cell and the upper adjacent cell, and the first cell and the lower adjacent cell; and a coupling connected to a rear surface of the back wall, the coupling including a weight bearing surface supporting the tray in a vertical orientation.

The divider walls and apertures are sized to sustain root growth through the apertures, so that a given plant has roots extending between at least two cells. In selected configurations, the apertures are located to preclude pooling of liquid in the first cell.

The panel assembly can also include an irrigation drip pan disposed above a top wall and an irrigation catch basin below the bottom wall.

The present assembly also provides for supporting vegetation by disposing a growing medium in a plurality of cells within a tray, the tray having an impervious back wall, a peripheral wall extending perpendicular to the back wall and a plurality of divider walls extending perpendicular from the back wall, the divider walls defining a plurality of cells within the peripheral wall including a first cell, an upper adjacent cell and a lower adjacent cell, the divider walls including apertures between the first cell and the horizontally adjacent cell, and the first cell and the vertically adjacent cell; orienting the tray to a vertical position; and passing water through the growing medium from the upper adjacent cell through the aperture to the first cell.

Seeding of the vertically oriented tray is provided by disposing a growing medium in a plurality of cells within a horizontally disposed tray, the tray having an impervious back wall, a peripheral wall extending perpendicular to the back wall and a plurality of divider walls extending perpendicular from the back wall, the divider walls defining a plurality of cells within the peripheral wall including a first cell, an upper adjacent cell and a lower adjacent cell, the divider walls including apertures between the first cell and the upper adjacent cell, and the first cell and the lower adjacent cell; watering the growing medium in the cells of the horizontally disposed tray; compressing the watered growing medium in the horizontally disposed tray; disposing vegetation into the watered and compressed growing medium; and orienting the tray into a vertical orientation.

The panel assembly includes a plurality of open faced cells, wherein the cells are fluidly interconnected for retaining a growing medium and live vegetation in a vertical orientation of the panel assembly and for supporting root growth through the apertures between adjacent cells. The root growth and loading of the growing medium minimize or substantially preclude the growing medium falling from the open face cells when the panel assembly is disposed in an inclined or vertical orientation. The fluid interconnection of the cells provides for gravitationally induced water transfer from the growing medium of a first cell to the growing medium of a second cell.

BRIEF DESCRIPTION OF THE SEVERAL VIEWS OF THE DRAWING(S)

FIG. 1 is a perspective view of a panel assembly for retaining a growing medium and vegetation in a vertical orientation.

FIG. 2 is a side elevational view of the panel assembly of FIG. 1.

FIG. 3 is a perspective view of a tray used in the panel assembly.

FIG. 4 is a side elevational view of the tray of FIG. 3.

FIG. 5 is a perspective view of a top wall of the panel assembly.

FIG. 6 is a side elevational view of the top wall of FIG. 5.

FIG. 7 is a perspective view of a divider wall for horizontal incorporation into the panel assembly.

FIG. 8 is a side elevational view of the divider wall of FIG. 7.

FIG. 9 is a perspective view of a divider wall for vertical incorporation into the panel assembly.

FIG. 10 is a side elevational view of the divider wall of FIG. 9.

FIG. 14 is a side elevational view of a coupling for mounting the panel assembly in a vertical orientation.

FIG. 15 is a side elevational view of an alternative coupling for mounting the panel assembly in a vertical orientation.

FIG. 16 is a front elevational view of an alternative configuration of the panel assembly.

FIG. 17 is a side elevational view of the panel assembly of FIG. 16.

FIG. 18 is a top plan view of the panel assembly of FIG. 16.

FIG. 19 is a perspective view of the panel assembly of FIG. 16.

FIG. 20 is a cross sectional view taken along lines 20-20 of FIG. 19.

FIG. 21 is a front elevational view of a divider assembly of the panel assembly of FIG. 16.

FIG. 22 is a side elevational view of the divider assembly of FIG. 21.

FIG. 23 is a front elevational view of a tray of the panel assembly of FIG. 16.

FIG. 24 is a side elevational view of the tray of FIG. 23.

FIG. 25 is a perspective view of the introduction of the divider assembly into the tray to form the panel assembly of FIG. 16.

DETAILED DESCRIPTION OF THE PREFERRED EMBODIMENTS

Figure 11:
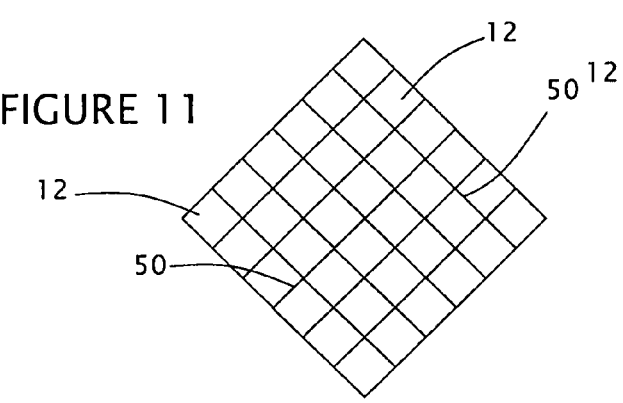
FIG. 11 is a schematic representation of an alternative cell configuration.

Referring to FIG. 1, a panel assembly 10 is disclosed having a plurality of cells 12 sized to retain a growing medium, wherein vegetation is cultivated in the growing medium such that vegetation grows through the growing medium from one cell to an adjacent cell. As seen in FIGS. 14 and 15, the panel assembly 10 is connected to a support 14 for retention in an inclined or vertical orientation. The support 14 can be any of a variety of structures, such as but not limited to existing walls including timber, metal or masonry, as well as stands or frames of sufficient structural integrity to retain the panel assembly. The term "vertical" encompasses perpendicular to the floor or ground as well as inclined to approximately 20° (or 4:12 pitch).

In one configuration, the panel assembly 10 includes a tray 20 having a peripheral wall 30 extending from a back wall 32; and a plurality of divider walls 50 within the peripheral wall, the divider walls defining a plurality of cells 12. As seen in FIGS. 14 and 15, the panel assembly 10 is operably oriented in a vertical orientation.

The tray 20 includes the back wall 32, wherein the back wall is impervious to water penetration as well as root growth. The back wall 32 is formed as a planar member, and can be constructed of a variety of materials including metals, plastics and composites. A satisfactory material has been found to be aluminum zinc or stainless steel. The back wall 32 can be formed of stainless steel having a thickness between approximately 0.025 inches and 0.050 inches, wherein a thickness of 0.032 inches has been found satisfactory.

The peripheral wall 30 includes two opposing parallel side walls 34,36, a bottom wall 38 and a top wall 42. In the configurations shown in FIG. 1, the top wall 42 and the bottom wall 38 are horizontal, and the side walls 34,36 extend vertically between the top and bottom walls.

The peripheral wall 30 extends from the back wall 32 to terminate at a free edge 31 spaced from the back wall 32. Thus, the peripheral wall 30 has a height extending from the back wall 32 to the free edge 31 of the peripheral wall 30. In selected configurations, the peripheral wall 30 has a height of between approximately 2 inches to 8 inches, with a typical height of the peripheral wall being approximately 4 inches to 6 inches.

In the configuration shown in FIG. 1, the peripheral wall 30 has a common height. That is, the side walls 34,36, top wall 42 and bottom wall 38 are of the same height. However, it is understood alternative configurations can include different heights among the side walls 34,36, the top wall 42 and the bottom wall 38.

While depending in part on the intended operating characteristics of the panel assembly 10, the top wall 42 and the bottom wall 38 include at least one aperture 43,39 corresponding to each defined cell 12. The side walls 34,36 are impervious to water and root penetration, as with the back wall 32. The apertures 43,39 in the top wall 42 and the bottom wall 38 are selected to permit the ready passage of water as well as vegetation growth.

As seen in FIGS. 5 and 6, the top wall 42 includes mounting tabs 44 and a mounting flange 46 for joining the top wall to the back wall 32 and the side walls 34,36. The top wall 42 also includes an upwardly inclined lip 48.

Referring to FIGS. 5 and 6, approximately 2% to 80% of the top wall 42 is apertured. That is, in one configuration, approximately, 10% of the material of the top wall 42 is removed to form the corresponding apertures 43.

Referring to FIG. 1, approximately 2% to 80% of the bottom wall 38 is apertured. That is, in one configuration, approximately, 10% of the material of the bottom wall 38 is removed to form the corresponding apertures 39.

Although the configuration of the panel assembly 10 having similarly apertured top wall 42 and bottom wall 38, it is understood the top wall 42 and the bottom walls 38 can each have a unique aperture pattern.

In one configuration, the side walls 34,36 are impervious to water penetration as well as root penetration. However, depending upon the intended operating configuration of the panel assembly 10, one or both of the side walls 34,36 can include apertures. That is, for a pair of adjacent panel assemblies 10, the abutting sidewalls can include apertures, thereby permitting vegetation growth between the adjacent panel assemblies. Alternatively, it is understood that the panel assemblies 10 may remain as independent units by employing impervious sidewalls 34,36, thereby precluding inter-panel vegetation growth.

Referring to FIG. 1, the side walls 34,36 extend above the top wall 42 by a distance sufficient to form a corresponding keyway 35,37. Thus, the keyway 35,37 is located outside of the area enclosed by the peripheral wall 30. The keyway 35,37 is selected to facilitate interconnection of the panel assembly 10 to an adjacent panel assembly 10, without requiring an aperture between the otherwise impervious sidewalls.

Figure 12:
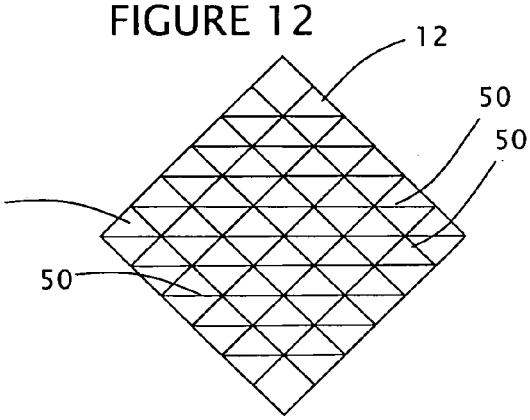
FIG. 12 is a schematic representation of another alternative cell configuration.
Figure 13:
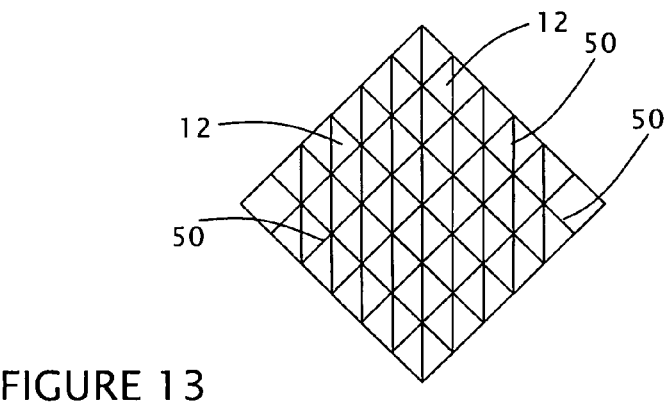
FIG. 13 is a schematic representation of a further cell configuration.

The divider walls 50 define a plurality of cells 12 within the peripheral wall 30. The divider walls 50 can be configured to define any of a variety of cell structures. For example, the cells 12 can be rectangular and defined by horizontally and vertically extending divider walls 50, as seen in FIG. 1. Alternatively, the divider walls 50 can extend at an inclined angle relative to the top wall 42 and the bottom wall 38, thereby defining diamond shaped cells, as seen in FIG. 11. Further, as shown in FIGS. 12 and 13, the divider walls 50 can include inclined intersecting divider walls as well as vertical and/or horizontal intersecting divider walls. Thus, the resulting cells 12 can be rectangular, square or triangular. Depending on the intended operating environment and supported vegetation, the cells 12 can be defined by three, four, five or more divider walls 50.

Generally, the divider walls 50 are elongate planar members. However, it is understood the divider walls 50 can include a concavity or a plurality of concavities that are arranged to correspond to the number of cells 12. Typically, any such concavity is located at the center of the respective cell 12.

Referring to FIGS. 11, 12 and 13, the divider walls can be arranged to define cells that are rectangular or triangular, wherein the triangular cells include a vertical or a horizontal wall. The apertures in the respective divider walls 50 are located to minimize or preclude the pooling of liquid, such as water, in the bottom of the given cell 12. That is, the lowest portion of the divider walls 50 defining a cell 12 include or are adjacent to an aperture communicating with a cell of a lower elevation.

The divider walls 50 extend perpendicular to the back wall 32, and thus are substantially horizontally oriented. It is contemplated selected divider walls 50 can include a front lip 52 at the free edge 31. The lip 52 is constructed to slope upward at an angle between approximately 5° to 60° wherein an angle of approximately 45° has been found satisfactory. However, the lip is an optional structure.

Generally, the plurality of cells 12 can be described as including a given cell having at least a first adjacent cell and a second adjacent cell. Depending on the particular configuration of the divider walls 50 and hence the cells 12, there can be three, four or more adjacent cells to the given cell.

Generally, the divider walls 50 define the plurality of cells 12, wherein a given cell has an upper adjacent cell and a lower adjacent cell. Depending upon the particular configuration of the divider walls 50, the given cell can have a plurality of upper adjacent cells and a plurality of lower adjacent cells. The upper adjacent cell has a bottom that is above the bottom of the given cell, and the lower adjacent cell has a bottom that is below the bottom of the given cell.

In the construction shown in FIG. 1, the divider walls 50 extend horizontally and vertically, thereby defining a plurality of rectangular cells 12. Each cell is defined by two horizontal divider walls 54 and two vertical divider walls 64. In this construction, the horizontal divider walls 54 have a plurality of apertures 55, wherein the apertures are spaced so that each cell 12 has an aperture exposed to an adjacent cell above the given cell and an aperture exposed to an adjacent cell below the given cell.

In the configuration of the divider walls 50 having a concavity, the respective aperture 55 is located at the apex of the concavity, thereby reducing the tendency of water to pool on the divider wall, or within the concavity or the cell 12.

The apertures 55 are sized to permit the transmission of water and well as vegetation growth through the aperture. The spacing and sizing of the apertures 55 is selected to reduce or substantially preclude the pooling of water within a given cell 12, which would otherwise contribute to detrimental plant environment and conditions, such as root rot.

Referring to FIG. 7, approximately 2% to 80% of the horizontal divider wall 54 for a rectangular cell is apertured. That is, in one configuration, approximately, 10% of the material of the horizontal divider wall 54 is removed to form the corresponding apertures.

Referring to FIGS. 7 and 8, the horizontal divider walls 54 include the front lip 52 and terminal mounting tabs 56. The mounting tabs 56 are constructed for engaging the corresponding side wall to retain the horizontal divider wall relative to the peripheral wall 30. The horizontal divider walls 54 also include a plurality of spaced engaging slots 57. In the configuration of FIGS. 1, 7, and 8, the engaging slots 57 extend from the lip 52 to approximately one half the width of the wall.

It has been found advantageous for the vertical divider walls 64 to include apertures 65, thereby forming horizontal communication between adjacent cells 12. The apertures 65 in the vertical divider walls 64 are also sized to permit the transmission of water and well as vegetation growth through the aperture 65.

Referring to FIGS. 9 and 10, approximately 2% to 80% of the vertical divider wall 64 for a rectangular cell is apertured. That is, in one configuration, approximately, 10% of the material of the vertical divider wall 64 is removed to form the corresponding apertures. Referring to FIGS. 9 and 10, the vertical divider wall 64 includes terminal mounting tabs 66 and an extending mounting flange 68. The mounting tabs 66 and mounting flange 68 are constructed for engaging the side walls 34,36 and back wall 32, respectively, to retain the vertical divider wall relative to the peripheral wall 30. The vertical divider walls 54 also include a plurality of spaced engaging slots 67. The engaging slots 67 are spaced at the desired separation (or frequency) of the horizontal divider walls 54.

Although the configuration of the panel assembly 10 having different horizontal divider walls 54 and vertical divider walls 64 has been set forth, it is understood the divider walls can be identical structures, each having the same aperture pattern.

In the configuration shown in FIG. 1, the divider walls 50 have a common height. That is, the horizontal divider walls 54 and vertical divider walls 64 are of the same height. However, it is understood alternative configurations can include different heights for the horizontal divider walls 54 and the vertical divider walls 64.

The panel assembly 10 includes a coupling 80 connected to a rear surface of the back wall 32, wherein the coupling is configured to support or retain the panel assembly in a vertical orientation. Generally, the coupling 80 includes a weight bearing surface supporting the tray 20 in the vertical orientation.

In one construction of the coupling 80, the back wall 32 extends above the top wall 42, wherein the portion of the back wall extending above the top wall includes a bracket or channel 82 adjacent an upper edge of the back wall. The coupling 80 thus can engage a flange or projecting bolt or stud from the support 14 for suspending the panel assembly 10 in a vertical orientation.

In another construction of the coupling 80, the portion of the back wall 32 extending above the top wall 42 includes at least one and preferably two or more keyways 85. The keyways 85 are sized to pass the head of a stud or bolt so as to then apply the load of the panel assembly 10 on the shank of the bolt or stud.

The coupling 80 can cooperate with a flange or bracket 90 that is mounted to the support 14. The flange or bracket 90 can be mounted with any of a variety of fasteners including threaded screws or bolts. Thus, the coupling 80 can engage the bracket to retain the panel assembly 10 relative to the support 14.

It is also contemplated the panel assembly 10 can be raised and lowered on a track or rail system, wherein the tracks are vertically oriented to provide for the panels sliding up and down along the tracks. In this construction, the tray is connected to the tracks, such as by welding, bolts, straps or fasteners.

As seen in FIGS. 14 and 15, the panel assembly 10 also includes an irrigation drip pan 110 and an irrigation catch basin 120. The irrigation drip pan 110 is disposed above the top wall 42 and retains a volume of liquid for introduction into the growing medium. The liquid can be water, or water based solution incorporating nutrients or chemicals as dictated by the requirements of the vegetation. The irrigation drip pan 110 generally functions as a reservoir for retaining the liquid, wherein a bottom of the drip pan includes apertures 111 sized to permit passage of the liquid at a controlled rate. The controlled rate is not active, but rather is dictated by the aperture size. Satisfactory apertures sizes range from approximately 1/64 to 1/8 inches. The irrigation drip pan 110 is sized to nest onto the top of the top wall 42, and be retained by the upwardly extending side walls 34,36 and the back wall 32.

The irrigation catch basin 120 is retained below the bottom wall 38 to retain liquid passing through the apertures 39 in the bottom wall. The irrigation catch basin 120 has a bottom and peripheral wall 30 having an open top that define a reservoir to retain the liquid. The irrigation catch basin 120 has a capacity greater than the irrigation drip pan 110, thereby reducing the cycling of emptying the irrigation catch basin 120. In one configuration, the irrigation catch basin 120 is independently coupled to the support 14. Thus, the irrigation catch basin 120 can be removed, emptied and reinstalled without requiring movement or displacement of the tray 20. The irrigation catch basin 120 includes a coupling 124, similar to the tray 20 for engaging the support 14. In one configuration, the coupling 124 on the irrigation catch basin 120 is the same as the tray 20, thereby providing for installation and retention by a single type or style of mounting into the support 14. Further, in one configuration of the irrigation catch basin 120, the peripheral wall 30 includes a front wall 126 which projects from the support 14, or plane of the back wall 32, a greater distance than the free edge 31 of the peripheral wall 30. The horizontal distance between the free edge 31 of the peripheral wall 30 and the front wall 126 of the irrigation catch basin 120 is selected so that material falling from the vegetation in the tray 20 drops into the irrigation catch basin 120.

Figure 26:
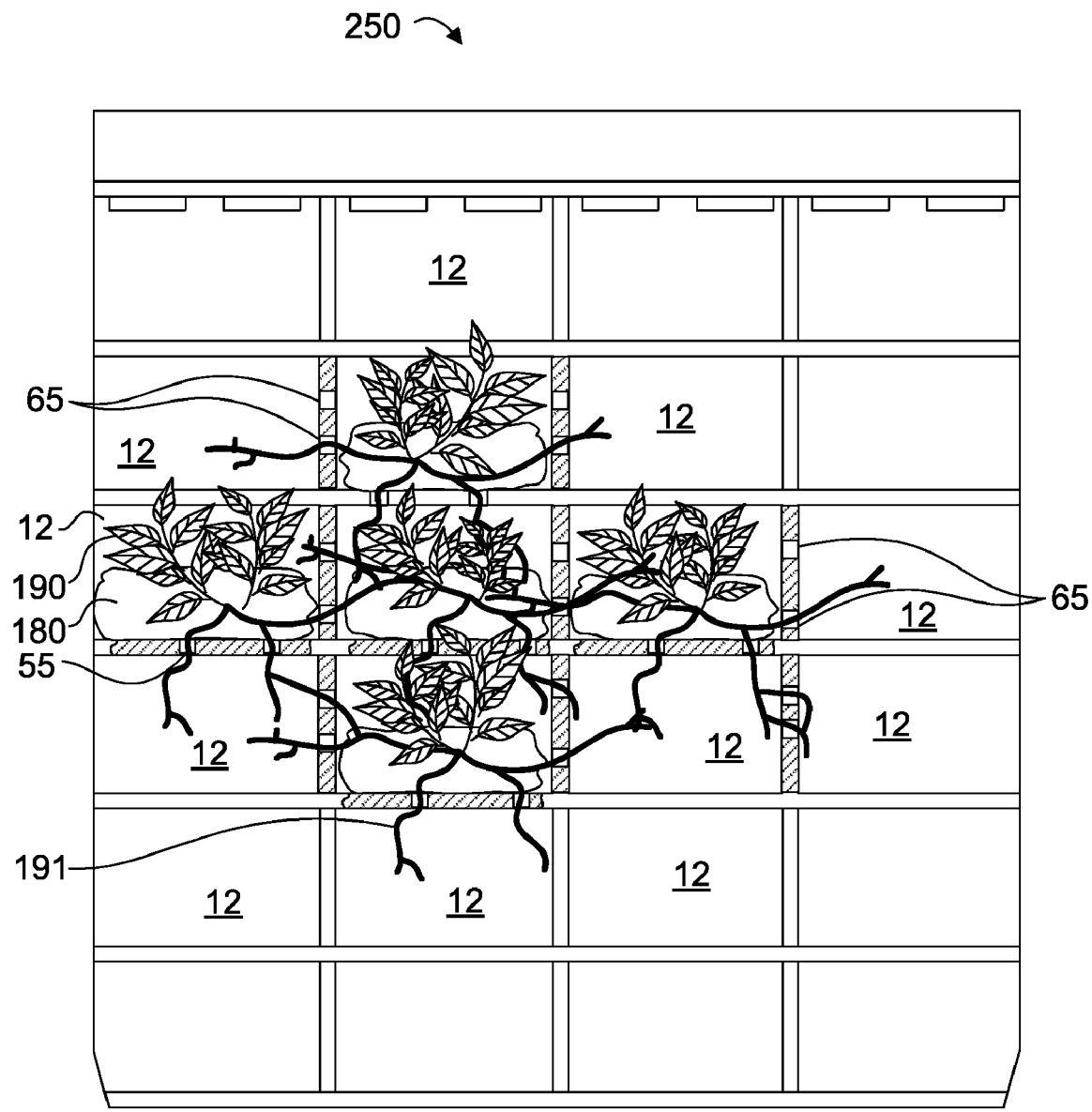
FIG. 26 is a front orthogonal view of a panel assembly of FIG. 16 illustrating the placement of growing medium with a cell, vegetation and root systems of a cell that penetrates adjacent cells.

FIG. 26 is a front orthogonal view of a panel assembly of FIG. 16 illustrating the placement of growing medium within a cell, vegetation and root systems of a cell that penetrates adjacent cells. A growing medium 180, or soil composition, is disposed within the cells 12. The growing medium 180 can comprise any nutrient laden medium that provides nutrients to the plants and can include combinations of soils, rocks, or other lightweight material into which the roots can grow to provide a stable base for the vegetation. The growing medium 180 typically comprises a mixture of soil and rock complying with ASTM-D422. The specific composition of the growing medium 180 is at least partially determined by the intended vegetation to be grown and the environmental conditions to which the panel assembly 10 will be subjected.

The vegetation or plant growth 190 is cultivated in the growing medium 180. A root system 191 of the vegetation 190 binds the growing medium 180 within the given cell 12. Further, the roots can migrate through the apertures 55,65 in the divider walls 50, thereby further retaining the growing medium 180 and the vegetation 190 in the cells 12.

The vegetation 190 can be any of a variety of plants compatible with the intended environment of the panel assembly 10.

Construction of the panel assembly 10 includes forming the tray 20, wherein the back wall 32, the side walls 34,36, and the bottom wall 38 can be formed from a single blank of material. The blank can be stamped and folded to form the structure in FIGS. 3 and 4.

The respective divider walls 50 and top wall 42 are formed and interconnected by the corresponding engaging slots 57 and 67. The divider walls 50 are then connected to the peripheral wall 30 and back wall 32 by mechanical fasteners or bonding such as spot or tack welding along the respective mounting tabs 56,66 and flanges 68.

The panel assembly 10 is then loaded with growing medium 180 and vegetation 190. In one method of loading the growing medium 180 and the vegetation 190, the panel assembly 10 is disposed in a horizontal position so that the cells 12 open upward. Growing medium 180 is then disposed into the cells 12. The growing medium 180 is then moistened with water. A satisfactory moisture content of the watered growing medium 180 has been found to be between approximately 5% and approximately 50%. The moistened growing medium 180 is then compacted, typically by hand although mechanical devices can be employed to subject the moistened growing medium to a compressive force. The amount of compaction depends in part on the composition of the growing medium 180. Satisfactory compaction has been found to include 5% to 25% from the initial moistened state.

The vegetation 190 is then disposed into the compacted, moistened growing medium 180. The panel assembly 10 is then supported in the vertical orientation by the coupling 80.

In use, liquid such as water is introduced into the irrigation drip pan 110. The water passes from the irrigation drip pan 110, through the top wall 42 and into the uppermost row of cells 12. The liquid migrates downward through the apertures 39 in the respective divider walls 50, to exit through the apertures 39 in the bottom wall 38. The liquid is then collected in the irrigation catch basin 120. As the irrigation catch basin 120 can be selectively removed from the panel assembly 10, the collected liquid can be emptied, or recycled as necessary.

Referring to FIGS. 16-25, an alternative configuration of the panel assembly 10 is shown. In the alternative configuration, the panel assembly includes a tray 220 and a divider assembly 250.

The tray 220 includes side walls 234,236 extending from a back wall 232, wherein the tray cooperates with the divider assembly 250 to define the plurality of cells 12. As with the first configuration of the panel assembly 10, the panel assembly can be operably oriented in a vertical orientation to an inclined orientation greater than approximately 4:12.

The tray 220 includes the back wall 232, wherein the back wall is impervious to water penetration as well as root growth. The back wall 232 is formed as a planar member, and can be constructed of a variety of materials including metals, plastics and composites. A satisfactory material has been found to be aluminum or stainless steel. The back wall 232 can be formed of stainless steel having a thickness between approximately 0.025 inches and 0.050 inches, wherein a thickness of 0.032 inches has been found satisfactory.

The two opposing parallel side walls 234,236 extend perpendicularly from the back wall 232.

The side walls 234,236 extend from the back wall 232 to terminate at a free edge 231 spaced from the back wall 232. Thus, the side walls 234,236 have a height extending from the back wall 232 to the free edge 231. In selected configurations, the side walls 234,236 have a height of between approximately 2 inches to 8 inches, with a typical height of the side walls being approximately 4 inches to 6 inches.

In the configuration shown in FIGS. 16-25, the side walls 234,236 have a common height. However, it is understood alternative configurations can include different heights between the side walls 234,236.

A lower or bottom end of each of the side walls 234,236 includes a taper 238, such that the side walls bend towards each other. The taper 238 extends along a length between approximately 0.5 inches to 3 inches, with a length of approximately 1.5 inches found to be satisfactory. The convergence of the tapers 238 is between approximately 1/8 inch and 1.5 inches, with a convergence of approximately 0.2 to 0.3 inches for each taper found to be satisfactory.

The lower end of each taper 238 includes a stop 240, wherein each stop projects towards the opposing side wall.

The free edge of the side walls 234,236 is defined by a hem 242. In one configuration, the hem 242 is integral with the side wall and is a folded over portion to overlie an adjacent section of the respective side wall to form a trough. The trough and the back wall 232 thus define a channel 235 extending along the back wall. In one configuration, the hem 242 extends along respective side wall except along the taper 238. While the taper 238 can be formed with the hem 242, it has been found satisfactory to form the hem along the linear or straight portion of the respective side wall 234,236.

The panel assembly 10 of FIGS. 16-25 includes the coupling 80 connected to a rear surface of the back wall 232 as previously described.

The divider assembly 250 includes horizontal divider walls 254 and vertical divider walls 264 corresponding to the horizontal divider walls 54 and vertical divider walls 64. The horizontal divider walls 254 and the vertical divider walls 264 include apertures as set forth in the description of the horizontal and vertical divider walls 54, 64.

However, in contrast to the first embodiment, the divider assembly 250 includes a top wall 258 and a bottom wall 268, wherein the vertical divider walls 264 include terminal tabs 266 for engaging the respective top wall and bottom wall of the divider assembly. The top wall 258 has a width substantially equal to the spacing between the side walls 234,236 of the tray 220. The bottom wall 268 has a width that is less than the top wall 258, wherein the width of the bottom wall is sized to be received between the tapers 238.

As seen in FIGS. 21, 22 and 25, the divider assembly 250 further includes lateral walls 272,274, wherein the lateral walls extend from the top wall 258 to terminate a distance from the bottom wall 268, thereby forming a gap 275. The gap 275 is sized to substantially match the taper 238 of the tray 220. That is, the vertical dimension of the gap 275 substantially equals to the vertical dimension of the taper 238. The bottom wall 268 of the divider assembly 250 is sized to extend between lower ends of the taper 238 of each side wall 234, 236.

The horizontal divider walls 254 extend between the lateral walls 272, 274 and can include any of a variety of mechanical interlock features such as tabs, flanges or detents. Further, the top wall 258, the bottom wall 268, the horizontal divider walls 254 and the vertical divider walls 264 can include flanges or tabs for overlying a portion of the back wall 232 for attachment to the back wall.

The panel assembly of FIGS. 16-25 is formed by constructing the divider assembly 250 and the tray 220. The lateral walls 272,274 of the divider assembly 250 are then slid into corresponding channels 235 of the tray 220 to locate the divider assembly within the tray. The bottom wall 268 of the divider assembly 250 contacts the stop 240 of each side wall 234,236 and the taper 238 extends from the end of the bottom wall to the width of the horizontal divider walls 254. The back wall 232 can include a lower flange sized to contact the bottom wall 268. Thus, the top wall forms a top wall of the panel assembly 10 and the bottom wall 268 of the divider assembly 250 forms a bottom wall of the panel assembly. As in the first embodiment, the top wall can include a flange for engaging the back wall 232, such as by rivets or spot welding.

The tapers 238 of this embodiment allow the ready vertical stacking of a plurality of panel assemblies 10, thereby facilitating the construction relative large modular units. That is, the tapers 238 are slidingly received within the upwardly projecting portions of the side walls 234, 236 and lateral walls 272, 274 of a lower panel assembly 10. In addition, this configuration allows for the construction of a number of different cell configurations by virtue of corresponding divider assemblies. The divider assemblies can be constructed to have uniform top, bottom and lateral walls, thereby providing operable installation into a single tray format. Thus, a plurality of panel assemblies can be interconnected, wherein each of the panel assemblies has a unique cell configuration.

The irrigation drip pan and irrigation catch basin are as previously set forth. Similarly, the loading of the growing medium and vegetation are also as previously set forth. While a preferred embodiment has been shown and described for particularity, it will be appreciated that various changes and modifications may suggest themselves to one having an ordinary skill in the art upon being appraised of the present invention. It is intended to encompass all such changes and modifications as fall within the scope of the pending claims.

The invention claimed is:

1. A panel assembly for supporting vegetation relative to a support, the panel assembly comprising:
    (a) a tray having an impervious back wall and a peripheral wall comprising a top wall and a bottom wall, wherein each of the top and bottom walls comprises at least one aperture, the peripheral wall extending perpendicular to the back wall;
    (b) a plurality of divider walls extending perpendicular from the back wall, the divider walls defining a plurality of cells within the peripheral wall including a first cell, an upper adjacent cell, a lower adjacent cell and a horizontally adjacent cell, each of the divider walls including more than one aperture between the first cell and the upper adjacent cell, between the first cell and the lower adjacent cell and between the first cell and the horizontally adjacent cell;
    (c) a coupling connected to a rear surface of the back wall, the coupling including a weight bearing surface supporting the tray in a vertical orientation; and
    (d) an irrigation drip pan disposed above the top wall.

2. A panel assembly for supporting vegetation relative to a support, the panel assembly comprising:
    (a) a tray having an impervious back wall and a peripheral wall comprising a top wall and a bottom wall, wherein each of the top and bottom walls comprises at least one aperture, the peripheral wall extending perpendicular to the back wall;
    (b) a plurality of divider walls extending perpendicular from the back wall, the divider walls defining a plurality of cells within the peripheral wall including a first cell, an upper adjacent cell, a lower adjacent cell and a horizontally adjacent cell, each of the divider walls including more than one aperture between the first cell and the upper adjacent cell, between the first cell and the lower adjacent cell and between the first cell and the horizontally adjacent cell;
(c) a coupling connected to a rear surface of the back wall, the coupling including a weight bearing surface supporting the tray in a vertical orientation; and
an irrigation catch basin disposed below the bottom wall.

3. A panel assembly for supporting vegetation relative to a support, the panel assembly comprising:
(a) a tray having an impervious back wall, two opposing sidewalls, a top wall and a bottom wall, the tray connecting to the support disposing the back wall in a vertical orientation, wherein each of the top and bottom walls comprises at least one aperture;
(b) a plurality of divider walls extending perpendicular to the back wall, the divider walls defining a plurality of cells including a first cell, a horizontally adjacent cell and a vertically adjacent cell, each of the divider walls including more than one aperture between the first cell and the horizontally adjacent cell, and the first cell and the vertically adjacent cell;
(c) a growing medium in the plurality of cells;
(d) vegetation within the growing medium, the vegetation including roots which extend between the first cell and one of the horizontally adjacent cell and the vertically adjacent cell; and
(e) an irrigation drip pan disposed above the top wall for retaining a volume of liquid, wherein a bottom portion of the irrigation drip pan comprises a plurality of apertures to permit passage of the volume of liquid at a controlled rate.

4. A panel assembly for supporting vegetation relative to a support, the panel assembly comprising:
(a) a tray having an impervious back wall, two opposing sidewalls, a top wall and a bottom wall, the tray connecting to the support disposing the back wall in a vertical orientation, wherein each of the top and bottom walls comprises at least one aperture;
(b) a plurality of divider walls extending perpendicular to the back wall, the divider walls defining a plurality of cells including a first cell, a horizontally adjacent cell and a vertically adjacent cell, each of the divider walls including more than one aperture between the first cell and the horizontally adjacent cell, and the first cell and the vertically adjacent cell;
(c) a growing medium in the plurality of cells;
(d) vegetation within the growing medium, the vegetation including roots which extend between the first cell and one of the horizontally adjacent cell and the vertically adjacent cell; and
(e) an irrigation catch basin disposed below the bottom wall.

5. A method for supporting vegetation, the method comprising:
(a) disposing a growing medium in a plurality of cells within a tray, the tray having an impervious back wall, a peripheral wall extending perpendicular to the back wall and a plurality of divider walls extending perpendicular from the back wall, the divider walls defining a plurality of cells within the peripheral wall including a first cell, an upper adjacent cell and a lower adjacent cell, each of the divider walls including more than one aperture between the first cell and a horizontally adjacent cell, and the first cell and a vertically adjacent cell;
(b) orienting the tray to a vertical position;
(c) passing water through the growing medium from the upper adjacent cell through the more than one aperture to the first cell; and
(d) locating an irrigation catch basin below the tray, the irrigation catch basin sized to capture liquid vertically passing from the tray.

6. A panel assembly for supporting vegetation relative to a support, the panel assembly comprising:
(a) a tray having an impervious back wall, a first side wall and a spaced second side wall, the first side wall and the second side wall extending perpendicular to the back wall, the first side wall defining a first channel with the back wall and the second side wall defining a second channel with the back wall; and
(b) a divider assembly having a plurality of horizontal divider walls and vertical divider walls defining a plurality of cells including a first cell, an upper adjacent cell and a lower adjacent cell, each of the divider walls including more than one aperture between the first cell and the upper adjacent cell, and between the first cell and the lower adjacent cell, the divider assembly including a first lateral wall and a second lateral wall which together define the lateral peripheries of the divider assembly, wherein the first and second lateral walls of the divider assembly are bounded by the first and second channels to locate the divider assembly within the tray such that the lateral peripheries of the divider assembly are disposed within the tray and adjacent the first and second channels and each of the first and second side walls further comprises a taper which extends toward one another and terminates at a terminating point, thereby allowing the ready vertical stacking of a plurality of the panel assemblies.

7. A panel assembly for supporting vegetation relative to a support, the panel assembly comprising:
(a) a tray having an impervious back wall, a first side wall and a spaced second side wall, the first side wall and the second side wall extending perpendicular to the back wall, the first side wall defining a first channel with the back wall and the second side wall defining a second channel with the back wall; and
(b) a divider assembly having a plurality of horizontal divider walls and vertical divider walls defining a plurality of cells including a first cell, an upper adjacent cell and a lower adjacent cell, each of the divider walls including more than one aperture between the first cell and the upper adjacent cell, and between the first cell and the lower adjacent cell, the divider assembly including a first lateral wall and a second lateral wall which together define the lateral peripheries of the divider assembly, wherein the first and second lateral walls of the divider assembly are bounded by the first and second channels to locate the divider assembly within the tray such that the lateral peripheries of the divider assembly are disposed within the tray and adjacent the first and second channels and each of the first and second side walls further comprises a taper which extends toward one another and terminates at a terminating point, thereby allowing the ready vertical stacking of a plurality of the panel assemblies, the divider assembly includes a top wall substantially the length of one of the horizontal divider walls and a shorter bottom wall configured to fit within the terminating points of the tapers.

* * * * *